(12) United States Patent
Seo

(10) Patent No.: US 11,584,367 B2
(45) Date of Patent: *Feb. 21, 2023

(54) METHOD AND APPARATUS FOR CONTROLLING VEHICLE

(71) Applicant: SAMSUNG ELECTRONICS CO., LTD., Suwon-si (KR)

(72) Inventor: Youngwan Seo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 265 days.

This patent is subject to a terminal disclaimer.

(21) Appl. No.: 17/078,998

(22) Filed: Oct. 23, 2020

(65) Prior Publication Data

US 2021/0039637 A1 Feb. 11, 2021

Related U.S. Application Data

(63) Continuation of application No. 15/996,587, filed on Jun. 4, 2018, now Pat. No. 10,814,868.

(30) Foreign Application Priority Data

Sep. 4, 2017 (KR) .......................... 10-2017-0112422

(51) Int. Cl.
*B60W 30/09* (2012.01)
*B60W 10/04* (2006.01)
(Continued)

(52) U.S. Cl.
CPC ............ *B60W 30/09* (2013.01); *B60W 10/04* (2013.01); *B60W 10/20* (2013.01);
(Continued)

(58) Field of Classification Search
CPC ...... B60W 30/09; B60W 10/04; B60W 10/20; G05D 1/0214; G05D 1/0223; G05D 1/0238; G05D 2201/0213
See application file for complete search history.

(56) References Cited

U.S. PATENT DOCUMENTS 6,223,125 B1 4/2001 Hall
6,370,475 B1 4/2002 Breed et al.
(Continued)

FOREIGN PATENT DOCUMENTS

JP 2003-231449 A 8/2003
JP 2016-9251 A 1/2016
(Continued)

OTHER PUBLICATIONS

Communication dated Oct. 20, 2021 by the Korean Intellectual Property Office in Korean Patent Application No. 10-2017-0112422.

(Continued)

*Primary Examiner* — Calvin Cheung
(74) *Attorney, Agent, or Firm* — Sughrue Mion, PLLC

(57) ABSTRACT

A method and apparatus for controlling a vehicle are provided. A lane in which a target vehicle is driving, and an object in a vicinity of the lane are detected from an image of surroundings of the target vehicle, a degree of danger of the object is evaluated, driving information of the target vehicle is determined based on the degree of danger, and the target vehicle is controlled based on the driving information.

20 Claims, 11 Drawing Sheets

(51) Int. Cl.
  *B60W 10/20* (2006.01)
  *G05D 1/02* (2020.01)
  *B62D 15/02* (2006.01)
  *G06V 20/58* (2022.01)
  *G06V 20/56* (2022.01)

(52) U.S. Cl.
  CPC ....... *B62D 15/0265* (2013.01); *G05D 1/0214* (2013.01); *G05D 1/0223* (2013.01); *G05D 1/0238* (2013.01); *G06V 20/58* (2022.01); *G06V 20/588* (2022.01); *B60W 2420/42* (2013.01); *B60W 2554/00* (2020.02); *B60W 2554/80* (2020.02); *B60W 2710/20* (2013.01); *B60W 2720/10* (2013.01); *G05D 2201/0213* (2013.01)

(56) References Cited

U.S. PATENT DOCUMENTS

| | | | |
|---|---|---|---|
| 8,473,144 B1 | 6/2013 | Dolgov et al. | |
| 8,880,273 B1 | 11/2014 | Chatham | |
| 9,238,467 B1 * | 1/2016 | Hoye | B60W 50/14 |
| 10,762,786 B1 * | 9/2020 | Dewey | B60W 30/09 |
| 2008/0042812 A1 * | 2/2008 | Dunsmoir | G06V 20/582 |
| | | | 348/148 |
| 2008/0243389 A1 | 10/2008 | Inoue et al. | |
| 2009/0051516 A1 | 2/2009 | Abel et al. | |
| 2009/0284361 A1 * | 11/2009 | Boddie | B60Q 9/008 |
| | | | 340/439 |
| 2010/0295707 A1 * | 11/2010 | Bennie | B60W 40/09 |
| | | | 340/439 |
| 2012/0083960 A1 | 4/2012 | Zhu et al. | |
| 2012/0143489 A1 * | 6/2012 | Lee | G08G 1/165 |
| | | | 701/400 |
| 2012/0143493 A1 * | 6/2012 | Tang | G01C 21/3407 |
| | | | 701/423 |
| 2012/0283895 A1 | 11/2012 | Noda | |
| 2012/0310466 A1 | 12/2012 | Fairfield et al. | |
| 2012/0310504 A1 | 12/2012 | DuHadway et al. | |
| 2014/0191858 A1 * | 7/2014 | Morgan | G07C 5/0816 |
| | | | 340/439 |
| 2014/0236414 A1 * | 8/2014 | Droz | G08G 1/015 |
| | | | 701/1 |
| 2015/0210279 A1 | 7/2015 | Agnew et al. | |
| 2015/0336547 A1 | 11/2015 | Dagan | |
| 2017/0106876 A1 * | 4/2017 | Gordon | B60W 50/082 |
| 2018/0134282 A1 | 5/2018 | Freienstein et al. | |

FOREIGN PATENT DOCUMENTS

| | | |
|---|---|---|
| JP | 2016-193719 A | 11/2016 |
| JP | 2017-21506 A | 1/2017 |
| JP | 2017-30547 A | 2/2017 |
| JP | 2017-91176 A | 5/2017 |
| KR | 20160056711 A | 5/2016 |
| KR | 20170017203 A | 2/2017 |
| KR | 10-2017-0022205 A | 3/2017 |
| WO | WO-2015126318 A1 * | 8/2015 ............ B60K 28/02 |

OTHER PUBLICATIONS

Communication dated Feb. 23, 2022 by the Korean Intellectual Property Office in Korean Patent Application No. 10-2017-0112422.

* cited by examiner

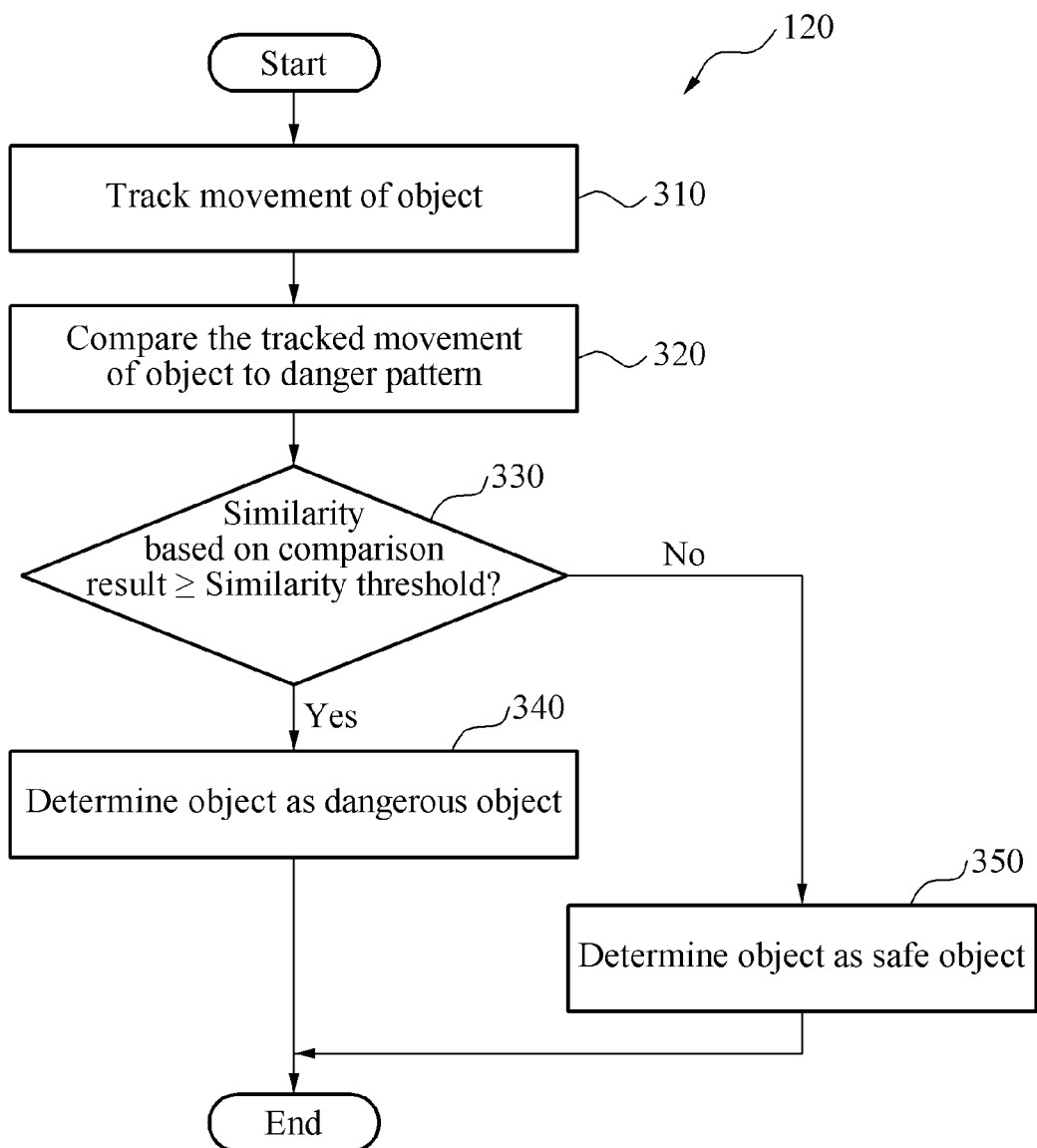

METHOD AND APPARATUS FOR CONTROLLING VEHICLE

CROSS-REFERENCE TO RELATED APPLICATIONS

This application is a Continuation application of U.S. application Ser. No. 15/996,587 filed on Jun. 4, 2018, which claims the benefit under 35 USC § 119(a) of Korean Patent Application No. 10-2017-0112422, filed on Sep. 4, 2017, in the Korean Intellectual Property Office, the entire disclosures of which are incorporated herein by reference for all purposes.

BACKGROUND

Field

The following description relates to a method and apparatus for controlling a driving vehicle based on surroundings.

Description of Related Art

An autonomous driving system and/or an advanced driver-assistance system (ADAS) allows a vehicle to automatically travel without a manipulation of a driver or enables autonomous driving with only a minimum intervention of the driver. The autonomous driving system and/or the ADAS analyzes surroundings including a nearby object, a road marking or road information from an input image, and provides an optimum driving path for autonomous driving or to assist a driver. The autonomous driving system and/or the ADAS create a path based on a center of a lane, and accordingly it is difficult to avoid or prepare for a situation the travel of the vehicle in the center of the lane is dangerous.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of controlling a vehicle, the method including detecting a lane in which a target vehicle is driving and an object in a vicinity of the lane from an image of surroundings of the target vehicle, evaluating a degree of danger caused by the object, determining driving information of the target vehicle based on the degree of danger, and controlling the target vehicle based on the driving information.

The surroundings may include any one or any combination of the object, a location of the object, a distance to the object from the target vehicle, a traffic situation around the target vehicle, a type of the lane, a road marking, a road line, and a weather.

The object may include any one or any combination of a nearby vehicle, a motorcycle, a bicycle, a pedestrian, a building and an animal.

The evaluating of the degree of danger may include evaluating the degree of danger based on any one or any combination of a type of the object, an area occupied by the object in a lane of the object, relative locations of the target vehicle and the object, whether an item is loaded in the object, and a load state of the item.

The method may include tracking a movement of the object, and comparing the tracked movement of the object to a danger pattern, and wherein the evaluating of the degree of danger may include evaluating the degree of danger based on a result of the comparison.

The evaluating of the degree of danger caused by the object may include determining any one or any combination of whether the object exists, a type of the object, a relative location of the object to the target vehicle, whether an item is loaded in the object, and a load state of the item.

The method may include detecting a gap between a first object in front of the target vehicle and a second object behind the target vehicle.

The determining of the driving information may include determining the driving information of the target vehicle based on the gap and the degree of danger.

The determining of the driving information based on the gap and the degree of danger may include determining the driving information based on a result of a comparison between the gap and a length of the object, in response to the object having a degree of danger exceeding a reference value.

The determining of the driving information based on the result of the comparison may include determining the driving information to adjust a speed of the target vehicle, in response to the gap being greater than or equal to the length of the object.

The method of claim 9, wherein the determining of the driving information based on the result of the comparison may include, determining driving information to reset a path of the target vehicle, in response to the gap being less than the length of the object.

The determining of the driving information to reset the path of the target vehicle may include determining driving information to reset the path of the target vehicle from a center of the lane to a right space, in response to the object being on a left side of the target vehicle, and determining driving information to reset the path of the target vehicle from the center of the lane to a left space, in response to the object being on a right side of the target vehicle.

The determining of the driving information may include comparing the degree of danger to a reference value, and the driving information may include any one or any combination of a speed of the target vehicle and a driving path of the target vehicle based on a result of the comparison.

The determining of the driving information may include determining the driving information based on any one or any combination of a degree of acceleration and/or deceleration of the target vehicle, and a change of the driving path, based on a result of the comparing of the degree of danger to the reference value.

The driving information may include any one or any combination of a location of the target vehicle, a location of the lane in which the target vehicle is driving, a speed of the target vehicle, and a driving path of the target vehicle.

In another general aspect, there is provided an apparatus for controlling a vehicle, the apparatus including an image sensor configured to capture surroundings of a target vehicle, and a processor configured to detect a lane in which the target vehicle is driving and an object in a vicinity of the lane from the image captured by the image sensor, to evaluate a degree of danger caused by the object, to determine driving information of the target vehicle based on the degree of danger, and to control the target vehicle based on the driving information.

The processor may be configured to evaluate the degree of danger based on any one or any combination of a type of the object, an area occupied by the object in a lane of the object, relative locations of the target vehicle and the object, whether an item is loaded in the object, and a load state of the item.

The apparatus may include a memory configured to store a danger pattern, wherein the processor may be configured to track a movement of the object, to compare the tracked movement of the object to the danger pattern, and to evaluate the degree of danger based on a result of the comparison between the tracked movement of the object and the danger pattern.

The processor may be configured to compare the degree of danger to a reference value and to determine, based on a result of the comparison between the degree of danger and the reference value, driving information comprising any one or any combination of a degree of acceleration and/or deceleration of the target vehicle and a change of the driving path.

Other features and aspects will be apparent from the following detailed description, the drawings, and the claims.

BRIEF DESCRIPTION OF THE DRAWINGS

FIG. 3 is a diagram illustrating an example of a method of evaluating a degree of danger of an object.

Figure 1:
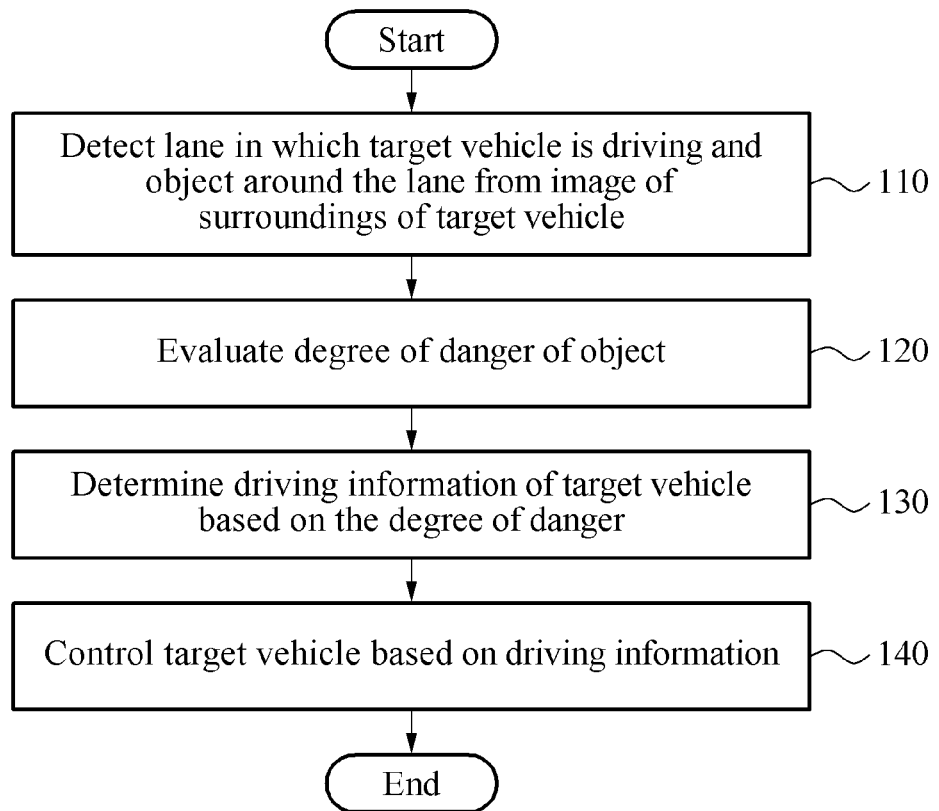
FIG. 1 is a diagram illustrating an example of a method of controlling a vehicle.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise.

In the following description, examples may be used to generate information to support a driver or for a control in an autonomous vehicle. Also, examples may be used to interpret visual information in a device including an intelligent system installed for fully autonomous driving or driving assistance in a vehicle, and used to assist safe and comfortable driving suitable for surroundings that include, for example, a traffic situation or road configuration. The examples described herein may be applicable to vehicles and vehicle management systems such as, for example, an autonomous vehicle, an intelligent vehicle, an advanced driver-assistance system (ADAS), a smartphone, or a mobile device.

In the following description, a "road" is a street of vehicles or people, and includes, for example, various types of roads such as highways, national roads, local roads or high-speed national roads. A road may include a single lane or a plurality of lanes. Lanes may correspond to road spaces distinguished from each other by road lines marked on a surface of a road. Also, a "lane" is understood as a space of a plane on which a vehicle is traveling among a plurality of lanes, i.e., as a space occupied and used by the vehicle. One lane is distinguished from the other lanes by right and left road lines of the lane.

In an example, the vehicle described herein refers to any mode of transportation, delivery, or communication such as, for example, an automobile, a truck, a tractor, a scooter, a motorcycle, a cycle, an amphibious vehicle, a snowmobile, a boat, a public transit vehicle, a bus, a monorail, a train, a tram, an autonomous or automated driving vehicle, an intelligent vehicle, a self-driving vehicle, an unmanned aerial vehicle, an electric vehicle (EV), a hybrid vehicle, a smart mobility, or a drone. In an example, smart mobility may include mobility devices such as, for example, electric wheels, an electric kickboard, and an electric bike. In an example, vehicles include motorized and non-motorized vehicles, for example, a vehicle with a power engine (for example, a cultivator or a motorcycle), a bicycle or a handcart. In an example, a vehicle in which a user rides among vehicles that are traveling on a road is referred to as a "target vehicle," and corresponds to, for example, an autonomous vehicle or an intelligent vehicle including an ADAS.

FIG. 1 illustrates an example of a method of controlling a vehicle. The operations in FIG. 1 may be performed in the sequence and manner as shown, although the order of some operations may be changed or some of the operations omitted without departing from the spirit and scope of the illustrative examples described. Many of the operations shown in FIG. 1 may be performed in parallel or concurrently. One or more blocks of FIG. 1, and combinations of the blocks, can be implemented by special purpose hardware-based computer that perform the specified functions, or combinations of special purpose hardware and computer instructions.

Referring to FIG. 1, in operation 110, an apparatus (hereinafter, referred to as a "vehicle control apparatus") for controlling a vehicle detects a lane in which a target vehicle is driving and an object in a vicinity of the lane from an image acquired by capturing surroundings of the target vehicle. The image is, for example, an image captured using an image sensor (for example, an image sensor 810 of FIG. 8) included in the vehicle control apparatus, or an image captured by an external device. The image includes a plurality of frames. The surroundings include, for example, any one or any combination of an object, a location of the object, a distance to the object, a traffic situation around the target vehicle, a type of a lane, a road marking, a road line or a weather.

In an example, an area in the vicinity of the lane includes lanes that are on a left side and a right side of the lane, or a front side or a rear side of the lane.

The object has an influence on a driving situation of a driver, and includes, for example, nearby vehicles other than the target vehicle, people including a pedestrian, an item, a building or an animal. The vehicles are understood to include any of the various types of vehicles defined above. One object or a plurality of objects may be provided.

The vehicle control apparatus recognizes or determines, from the image using a pre-trained neural network, any one or any combination of whether the object exists, a type of the object, a relative location of the object to the target vehicle, whether an item loaded in the object exists, and a load state of the item. The neural network is trained in advance to recognize a lane, an object and/or surroundings based on information acquired by the image sensor or other devices. The neural network includes, for example, a neural network having a convolution structure, a neural network having a recurrent structure, or a combination thereof.

In operation 120, the vehicle control apparatus evaluates a degree of danger of the object detected in operation 110. In an example, the degree of danger is a degree to which the object has an influence on a driving situation of the target vehicle, a degree to which an attention is required during driving of the target vehicle due to the object, or an expected probability of an accident occurring due to the object.

For example, the vehicle control apparatus evaluates the degree of danger, based on any one or any combination of a type of the object, an area occupied by the object in a lane, relative locations of the target vehicle and the object, whether an item loaded in the object exists, and a load state of the item. An example of a method of evaluating a degree of danger of an object in the vehicle control apparatus will be further described in detail below with reference to FIGS. 2A through 4C.

In operation 130, the vehicle control apparatus determines driving information of the target vehicle based on the degree of danger evaluated in operation 120. The driving information includes, for example, any one or any combination of a location of the target vehicle associated with the lane, a speed of the target vehicle and a driving path of the target vehicle. The driving information includes, for example, a control parameter to control steering and speed of a vehicle. In an example, the location of the target vehicle associated with the lane includes an area occupied by the target vehicle in the lane or a distance from a center of the lane.

In an example, in operation 130, the vehicle control apparatus compares the degree of danger to a reference value. The vehicle control apparatus determines driving information including any one or any combination of a speed of the target vehicle and a driving path of the target vehicle, based on a result of the comparison. Also, the vehicle control apparatus determines driving information including any one or any combination of a degree of acceleration and/or deceleration of the target vehicle and whether to change the driving path, based on the result of the comparison. In an example, when the degree of danger is greater than the reference value, the vehicle control apparatus determines the driving information to change the driving path or to set the degree of acceleration and/or deceleration to be high. In another example, when the degree of danger is less than the reference value, the vehicle control apparatus determines the driving information to set the degree of acceleration and/or deceleration to be low, or to maintain the driving path without a change. An example of a method of determining driving information of a target vehicle in the vehicle control apparatus will be described in detail below with reference to FIGS. 5 through 7.

In operation 140, the vehicle control apparatus controls the target vehicle based on the driving information. For example, the vehicle control apparatus controls a speed and a driving path of the target vehicle based on the driving information.

Figure 2A:
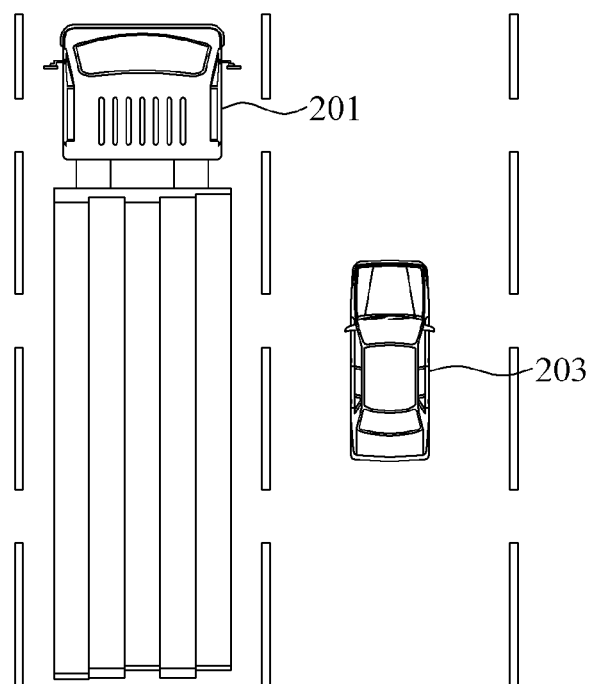
FIGS. 2A and 2B are diagrams illustrating examples of a method of evaluating a degree of danger of an object.
Figure 2B:
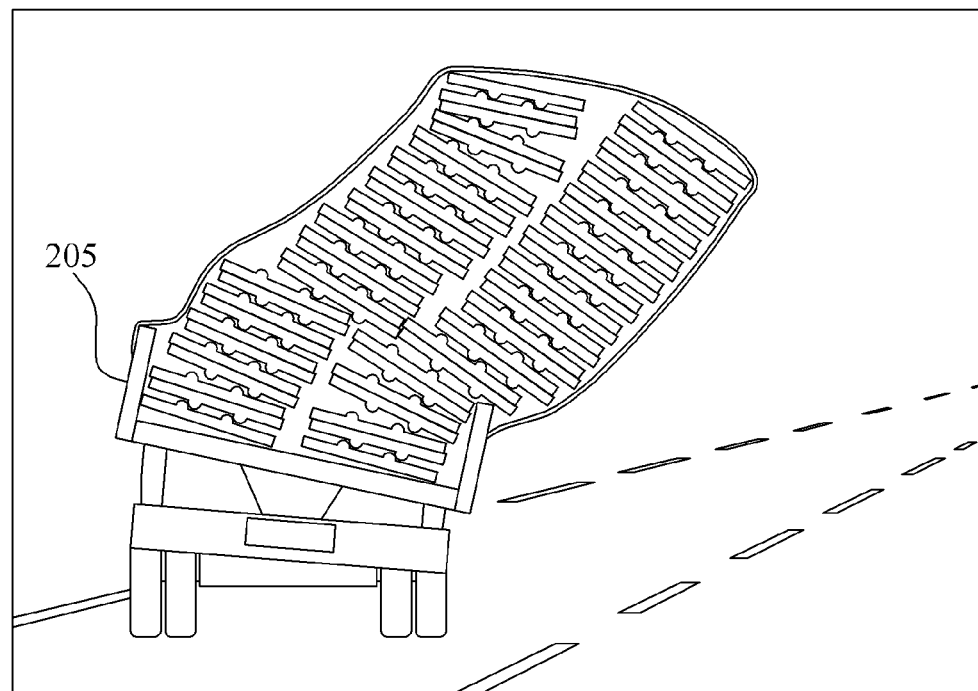

FIGS. 2A and 2B illustrate an example of a method of evaluating a degree of danger of an object. FIG. 2A illustrates an example in which a large truck 201 as an object is operating in a second lane that is on a left side of a target vehicle 203.

A vehicle control apparatus evaluates a degree of danger of the large truck 201 based on a type of an object, i.e., the large truck 201, an area occupied by the large truck 201 in the second lane, and relative locations of the target vehicle 203 and the large truck 201. In an example, the area occupied by the large truck 201 in the second lane is a ratio of a width of the large truck 201 to a horizontal width of the second lane. In an example, the relative locations of the target vehicle 203 and the large truck 201 include a distance between the target vehicle 203 and the large truck 201, and a location of the large truck 201 corresponding to a front side, a rear side, a left side or a right side of the target vehicle 203.

For example, when an object is a vehicle, the vehicle control apparatus evaluates a degree of danger of the object as 70%. When the object is a motorcycle, the vehicle control apparatus evaluates a degree of danger of the object as 80%. When the object is a pedestrian, the vehicle control apparatus evaluates a degree of danger of the object as 30%. When the object is an animal, the vehicle control apparatus evaluates a degree of danger of the animal as 10%. When the object is a taxi, a bus or the large truck 201 of FIG. 2A, the vehicle control apparatus evaluates a degree of danger of the object as 75%. When the object is a bus or a school vehicle, the vehicle control apparatus evaluates a degree of danger of the object as 65%. Thus, the vehicle control apparatus differently evaluates degrees of danger of objects, based on a type or class of objects or subclasses of each class of objects.

In an example, when an area occupied by an object in a lane exceeds 100% of the lane, the vehicle control apparatus evaluates a degree of danger of the object as 100%. When an object occupies 90% of the lane, the vehicle control apparatus evaluates a degree of danger of the object as 90%.

Also, the vehicle control apparatus evaluates a degree of danger of an object based on relative locations of a target vehicle and the object. For example, when the target vehicle and the object are relatively far away from each other, the vehicle control apparatus evaluates a degree of danger of the object to be low. When the target vehicle and the object are relatively close to each other, the vehicle control apparatus evaluates the degree of danger of the object to be high.

Furthermore, the vehicle control apparatus evaluates a degree of danger of an object based on a combination of a type of the object, an area occupied by the object in a lane and relative locations of the target vehicle and the object. In an example, when an object is a large truck, occupies 95% of a lane and is located close to the target vehicle, the vehicle control apparatus evaluates a degree of danger of the object as 98%. In another example, when an object is a pedestrian, is located outside a lane and is spaced apart from a target vehicle by at least 1 meter (m), the vehicle control apparatus evaluates a degree of danger of the object as 5%.

FIG. 2B illustrates an example in which an overloaded vehicle 205 is operating in front of the target vehicle 203. A vehicle control apparatus evaluates a degree of danger of an object based on whether an item loaded in the object exists and a load state of the item, in addition to a type of the object, an area occupied by the object in a lane, and relative locations of the target vehicle and the object.

When items are loaded in an object (for example, the vehicle 205), the vehicle control apparatus evaluates a degree of danger of the object as 30%. When items are not loaded in the object, the vehicle control apparatus evaluates a degree of danger of the object as 5%. Referring to FIG. 2B, when the vehicle 205 is overloaded and a load state exceeds 100% of an area of a lane occupied by the vehicle 205, i.e., when items are loaded dangerously in the vehicle 205, the vehicle control apparatus evaluates a degree of danger of the vehicle 205 as 100%.

In an example, the vehicle control apparatus evaluates a degree of danger of an object based on a lookup table that is provided in association with any one or any combination of a type of the object, an area occupied by the object in a lane, relative locations of the target vehicle and the object, whether an item is loaded in the object, and a load state of the item. In this example, the lookup table is provided based on statistics, such as traffic accident statistical data in each situation. The lookup table is stored in, for example, a memory of the vehicle control apparatus.

In another example, the vehicle control apparatus evaluates, using a pre-trained neural network, a degree of danger of an object based on any one or any combination of a type of the object, an area occupied by the object in a lane, relative locations of the target vehicle and the object, whether an item is loaded in the object, and a load state of the item. In an example, the neural network is trained in advance to determine the degree of danger of the object based on a type of the object, an area occupied by the object in a lane, relative locations of the target vehicle and the object, whether an item loaded in the object exists, and a load state of the item.

FIG. 3 illustrates an example of a method of evaluating a degree of danger of an object. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer that perform the specified functions, or combinations of special purpose hardware and computer instructions. In addition to the description of FIG. 3 below, the descriptions of FIGS. 1-2B are also applicable to FIG. 3, and are incorporated herein by reference. Thus, the above description may not be repeated here.

Referring to FIG. 3, in operation 310, a vehicle control apparatus tracks a movement of an object. For example, the vehicle control apparatus tracks a movement of an object for a time interval, for example, 5 seconds or 10 seconds, from an image acquired by capturing surroundings of a target vehicle. In this example, the movement of the object includes a driving direction and a driving angle of the object.

In operation 320, the vehicle control apparatus compares the tracked movement of the object to a danger pattern. The danger pattern corresponds to a driving pattern that mainly occurs during driving that is dangerous for an operation of a vehicle, for example, drowsy driving, drunk driving or inexperienced driving. Examples of danger patterns will be further described below with reference to FIGS. 4A through 4C.

The vehicle control apparatus evaluates a degree of danger of the object based on a result of comparison between the tracked movement of the object and the danger pattern. For example, the vehicle control apparatus determines whether a similarity based on the result of comparison is greater than or equal to a similarity threshold in operation 330. When the similarity is determined to be greater than or equal to the similarity threshold in operation 330, the vehicle control apparatus determines the object as a dangerous object in operation 340. The similarity threshold is, for example, 70%.

When the similarity is determined to be less than the similarity threshold in operation 330, the vehicle control apparatus determines the object as a safe object in operation 350. For example, the vehicle control apparatus divides a comparison section between the similarity and the similarity threshold, and determines an object corresponding to a similarity greater than or equal to 70% as a dangerous object, determines an object corresponding to a similarity greater than or equal to 40% and less than 70% as a non-dangerous object and determines an object corresponding to a similarity less than 40% as a safe object.

Figure 4A:
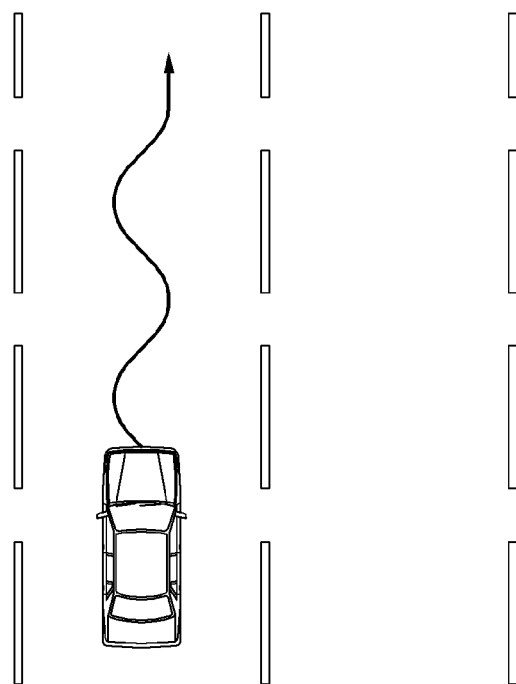
FIGS. 4A through 4C are diagrams illustrating examples of danger patterns.
Figure 4B:
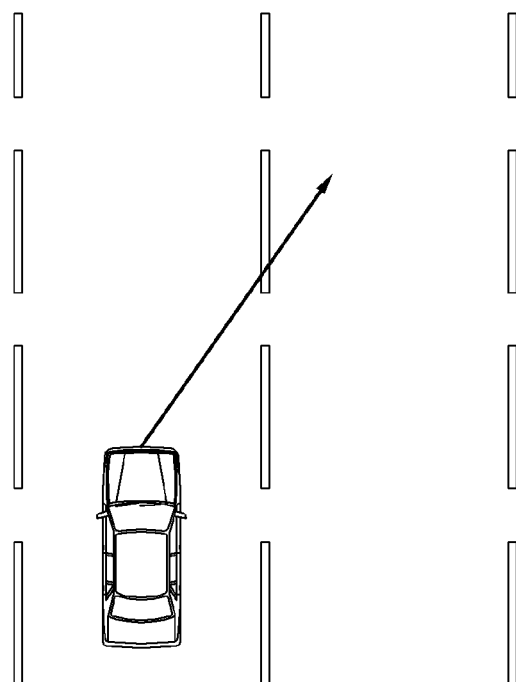
Figure 4C:
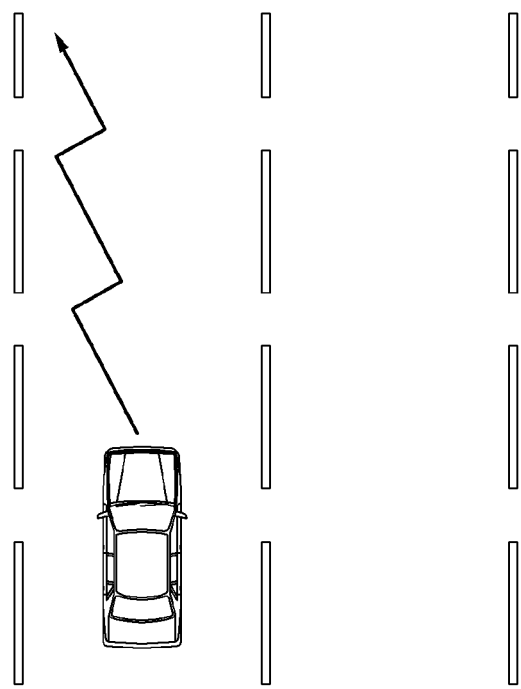

FIGS. 4A through 4C illustrate examples of danger patterns. FIG. 4A illustrates a zigzag driving pattern in which a vehicle is driving from side to side in a zigzag path based on a center of a lane. The zigzag driving pattern of FIG. 4A is a driving pattern that occurs during drowsy driving or drunk driving, and corresponds to a danger pattern.

FIG. 4B illustrates a driving pattern in which a center of a vehicle moves from a left side to a right side of a lane. FIG. 4C illustrates a zigzag driving pattern in which a center of a vehicle moves from a right side to a left side of a lane. As shown in of FIGS. 4B and 4C, a driving pattern in which the center of the vehicle deviates from a center of the lane, or a driving pattern in which the vehicle is driving in a zigzag path while the center of the vehicle is deviating from the center of the lane may also occur during drowsy driving or drunk driving, and corresponds to a danger pattern.

Although not shown in FIGS. 4A through 4C, various driving patterns that frequently occur during inexperienced driving, drowsy driving or drunk driving corresponds to danger patterns. For example, a driving pattern in which a vehicle is operating by stepping on an opposite lane in which another vehicle exists based on a center of a lane, or a driving pattern of frequently stepping on a brake corresponds to a danger pattern.

Figure 5:
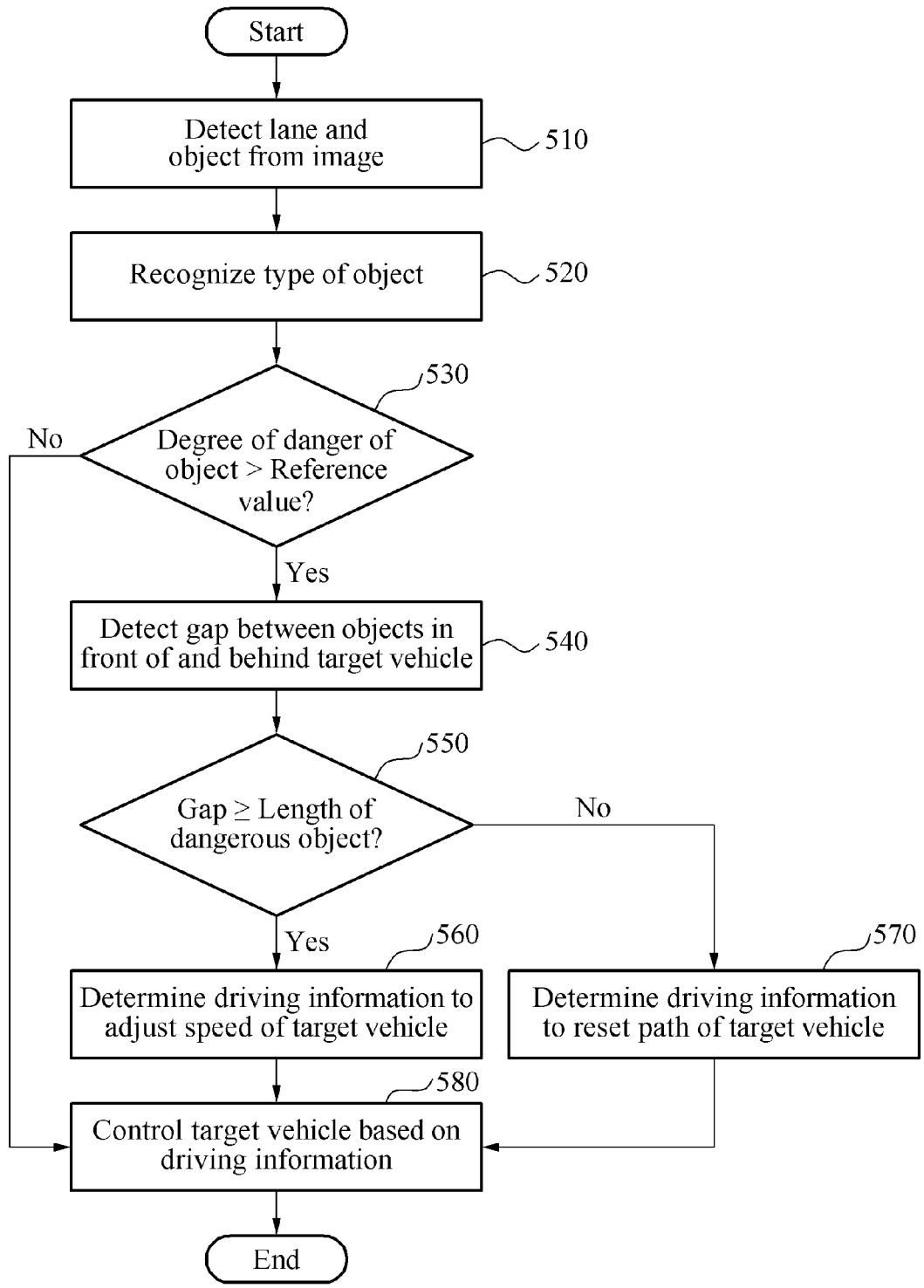
FIG. 5 is a diagram illustrating an example of a method of controlling a vehicle.

FIG. 5 illustrates another example of a method of controlling a vehicle. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. One or more blocks of FIG. 5, and combinations of the blocks, can be implemented by special purpose hardware-based computer that perform the specified functions, or combinations of special purpose hardware and computer instructions. In addition to the description of FIG. 5 below, the descriptions of FIGS. 1-4C are also applicable to FIG. 5, and are incorporated herein by reference. Thus, the above description may not be repeated here.

Referring to FIG. 5, in operation 510, a vehicle control apparatus detects an object and a lane in which a target vehicle is driving from an image acquired by capturing surroundings of the target vehicle.

In operation 520, the vehicle control apparatus recognizes or determines a type of the object. For example, the vehicle control apparatus determines a type of the object detected in operation 510 using a neural network that is trained in advance to recognize or determine a type of an object. In an example, the vehicle control apparatus determines, using the neural network, a relative location of the object to the target vehicle, whether an item is loaded in the object, and a load state of the item, in addition to the type of the object.

In operation 530, the vehicle control apparatus evaluates a degree of danger of the object based on the type of the object, and compares the degree of danger to a reference value. When the object is determined not to be a dangerous object, and the object has a degree of danger that does not exceed the reference value (for example, 70%) based on a result of comparison obtained in operation 530, in operation 580, the vehicle control apparatus controls the target vehicle based on current driving information without a change in the driving information.

When the object is determined to be a dangerous object, and the object has a degree of danger exceeding the reference value (for example, 70%) based on the result of comparison of operation 530, the vehicle control apparatus detects a gap between an object in front of the target vehicle and an object behind the target vehicle in operation 540. In operation 540, the vehicle control apparatus detects a gap between a first object in front of the target vehicle and a second object behind the target vehicle.

In an example, the vehicle control apparatus determines the driving information based on the gap and the degree of danger. For example, the vehicle control apparatus determines the driving information based on a result of comparison between the gap detected in operation 540 to a length of a dangerous object that has a degree of danger exceeding the reference value.

In operation 550, the vehicle control apparatus determines whether the gap detected in operation 540 is greater than or equal to the length of the dangerous object. When the gap is determined to be greater than or equal to the length of the dangerous object in operation 550, in operation 560, the vehicle control apparatus determines driving information to adjust a speed of the target vehicle. An example of a method of determining driving information to adjust a speed of the target vehicle in the vehicle control apparatus will be further described below with reference to FIG. 6.

When the gap is determined to be less than the length of the dangerous object in operation 550, in operation 570, the vehicle control apparatus determines driving information to reset a path of the target vehicle. An example of a method of determining driving information to reset a path of the target vehicle in the vehicle control apparatus will be further described below with reference to FIG. 7.

In operation 580, the vehicle control apparatus controls the target vehicle based on the driving information determined in operation 560 or 570.

Figure 6:
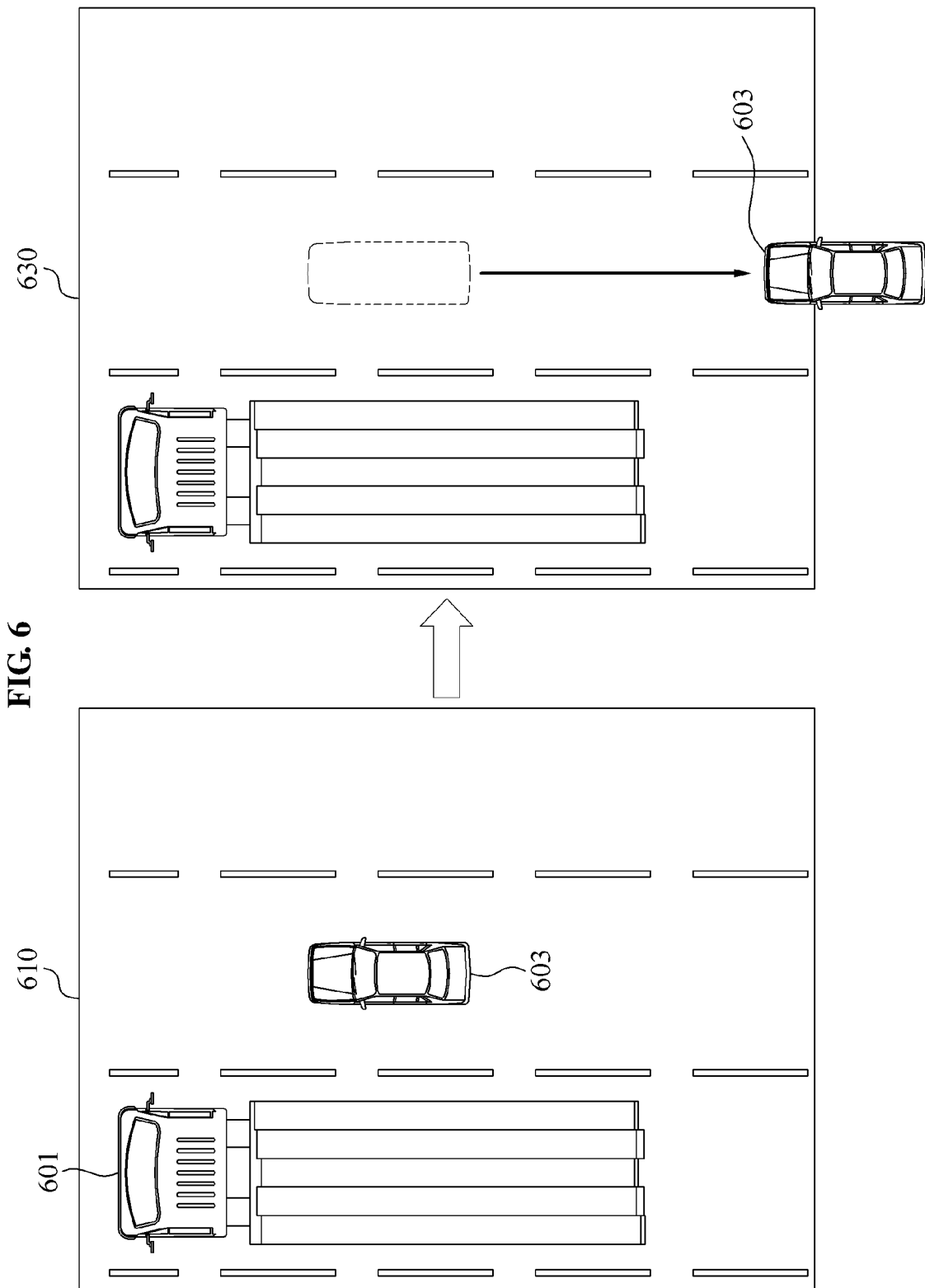
FIGS. 6 and 7 are diagrams illustrating examples of a method of determining driving information of a target vehicle.

FIG. 6 illustrates an example of a method of determining driving information to adjust a speed of a target vehicle. A portion 610 of FIG. 6 illustrates an example in which a dangerous object 601 is traveling on a left side of a target vehicle 603. In this example, it is assumed that a first object (not shown) is in front of the target vehicle 603 and a second object (not shown) is behind the target vehicle 603, that a gap between the first object and the second object is 25 m, and that the dangerous object 601 has a length of 8 m.

A vehicle control apparatus determines driving information by comparing the gap and the length of the dangerous object 601. Because the gap of 25 m is greater than the length of 8 m, the vehicle control apparatus determines driving information to adjust a speed of the target vehicle 603.

The vehicle control apparatus determines driving information (for example, a speed control parameter of a target vehicle) to increase or decrease the speed of the target vehicle 603 so that the target vehicle 603 is located in a space other than areas near the dangerous object 601 on a lane. For example, the vehicle control apparatus determines a speed control parameter to decrease the speed of the target vehicle 603 as shown in a portion 630 of FIG. 6.

Figure 7:
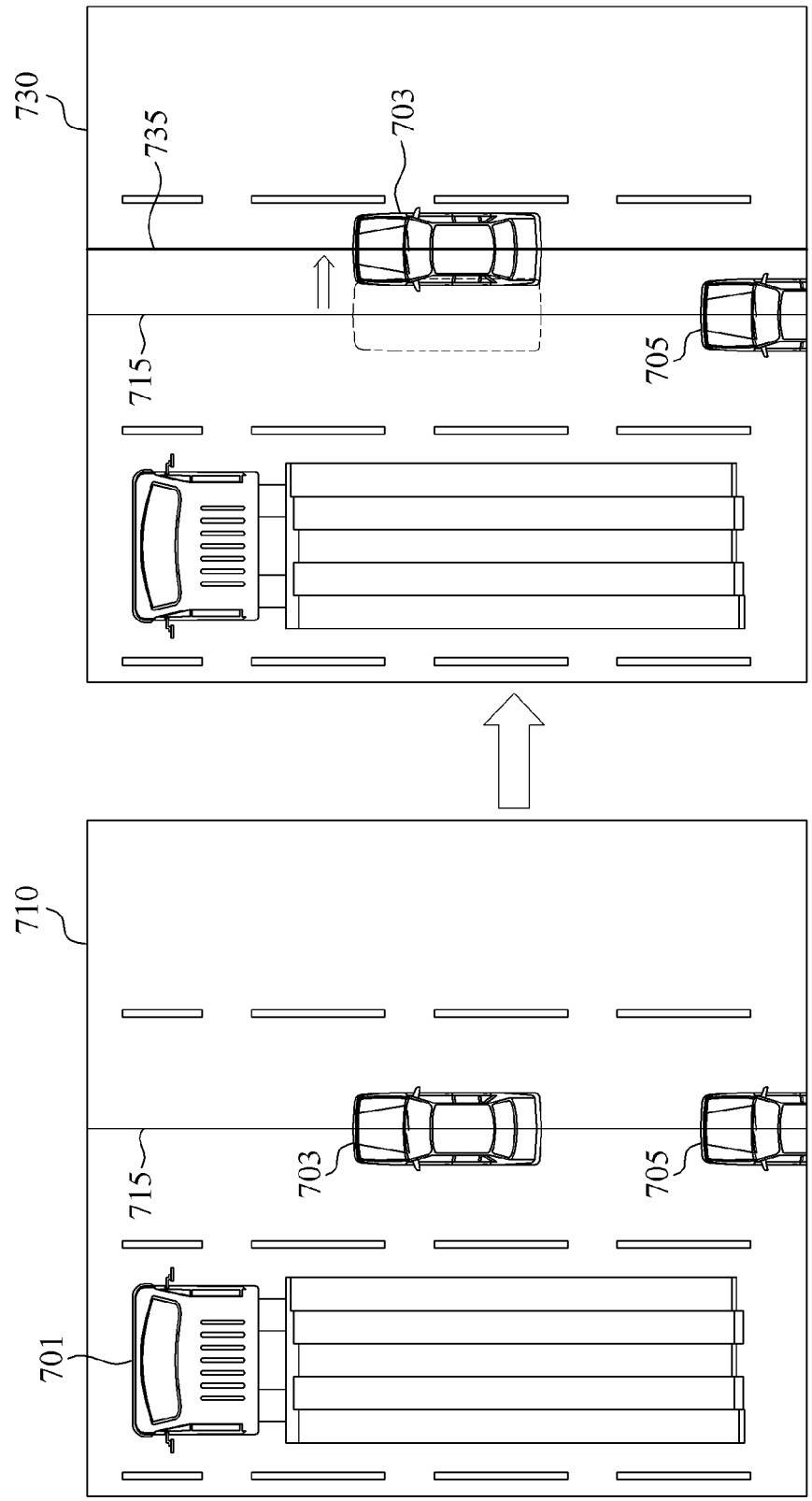

FIG. 7 illustrates an example of a method of determining driving information of a target vehicle. A portion 710 of FIG. 7 illustrates an example in which a dangerous object 701 is traveling on a left side of a target vehicle 703, a first vehicle (not shown) is traveling in front of the target vehicle 703, and a second vehicle 705 is traveling behind the target vehicle 703. In this example, it is assumed that a gap between the first vehicle and the second vehicle 705 is 9.5 m, and that the dangerous object 701 has a length of 10 m.

Generally, an autonomous driving system and/or an ADAS create a path based on a central line 715 of a lane. Accordingly, although the dangerous object 701 is in a vicinity of the target vehicle 703 as shown in the portion 710, the target vehicle 703 is driving along the path created based on the central line 715. Thus, it is difficult to prepare for a dangerous situation that occurs suddenly due to the dangerous object 701.

For example, when it is difficult to change a lane due to objects located on a right side and left side of the target vehicle 703, a vehicle control apparatus resets a path of the target vehicle 703 to be in a space apart from the dangerous object 701 in a lane, to prepare for a dangerous situation that occurs suddenly due to the dangerous object 701.

The vehicle control apparatus determines driving information by comparing the gap and the length of the dangerous object 701. Because the gap of 9.5 m is less than the length of 10 m, the vehicle control apparatus determines driving information to reset the path of the target vehicle 703. For example, when the dangerous object 701 is on the left side of the target vehicle 703 as shown in the portion 710, the vehicle control apparatus determines driving information to reset the path of the target vehicle 703 from the central line 715 to a right space of the lane. As shown in a portion 730 of FIG. 7, the vehicle control apparatus determines driving information to move the central line 715 to a central line 735 that is reset in the right space of the lane and to reset the path of the target vehicle 703 to the right space of the lane based on the central line 735.

Although not shown in FIG. 7, when the dangerous object 701 is on the right side of the target vehicle 703, the vehicle control apparatus determines driving information to reset the path of the target vehicle 703 from a central line of the lane to a left space.

When changing of the lane is possible because an object does not exist in the right side and the left side of the target vehicle 703, the vehicle control apparatus determines driving information to change the path of the target vehicle 703 to another lane far away from the dangerous object 701.

Figure 8:
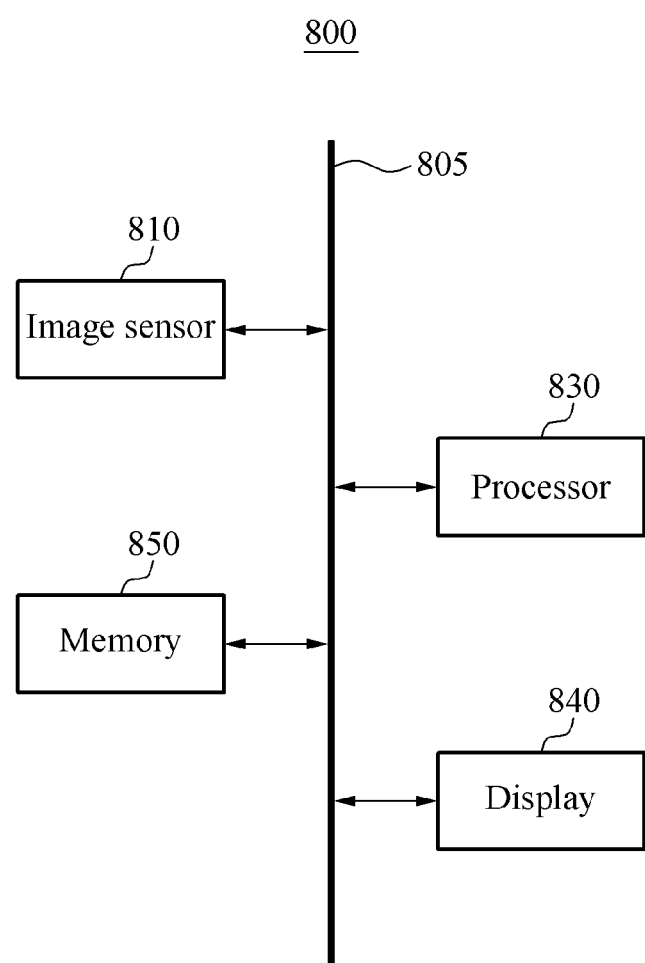
FIG. 8 is a diagram illustrating an example of an apparatus for controlling a vehicle.

FIG. 8 illustrates an example of a vehicle control apparatus 800. Referring to FIG. 8, the vehicle control apparatus 800 includes an image sensor 810, a processor 830, a display 840, and a memory 850. The image sensor 810, the processor 830, the display 840, and the memory 850 communicate with each other via a communication bus 805.

The image sensor 810 captures surroundings of a target vehicle. The image sensor 810 includes, for example, a charge coupled device (CCD) image sensor, a complementary metal oxide semiconductor (CMOS) image sensor or a vision sensor.

In an example, the processor 830 detects a lane in which the target vehicle is driving and an object in a vicinity of the lane from the image captured by the image sensor 810, and evaluates a degree of danger of the object. In an example, the processor 830 determines driving information of the target vehicle based on the degree of danger, and controls the target vehicle based on the driving information. In an example, the processor 830 displays the driving path and/or the changed driving path on the display 840.

For example, the processor 830 evaluates the degree of danger based on any one or any combination of a type of the object, an area occupied by the object in a lane, relative locations of the target vehicle and the object, whether an item is loaded in the object, and a load state of the item.

The memory 850 stores danger patterns. The processor 830 tracks a movement of the object and compares the tracked movement of the object to the danger pattern. The processor 830 evaluates the degree of danger based on a result of the comparison.

In an example, the processor 830 includes a neural network that is used to determines, based on the image captured by the image sensor 810, any one or any combination of whether the object exists, a type of the object, a relative location of the object to the target vehicle, whether an item is loaded in the object, and a load state of the item. The neural network is trained in advance to recognize a lane, an object and/or surroundings based on information acquired by the image sensor 810 or other devices. The neural network includes, for example, a neural network having a convolution structure, a neural network having a recurrent structure, or a combination thereof.

The processor 830 compares the degree of danger to a reference value. The processor 830 determines driving information including any one or any combination of a degree of acceleration and/or deceleration of the target vehicle and whether to change the driving path, based on a result of the comparison.

Also, the processor 830 performs at least one of the methods described above with reference to FIGS. 1 through 7. The processor 830 executes a program and controls the vehicle control apparatus 800. A program code executed by the processor 830 is stored in the memory 850.

The memory 850 includes, for example, a volatile memory or a nonvolatile memory. The memory 850 includes a mass storage medium, for example, a hard disk, and stores a variety of data. The memory 850 stores a variety of information generated in a processing process performed by the processor 830. Also, the memory 850 stores a variety of data and programs.

In an example, the display 840 is a physical structure that includes one or more hardware components that provide the ability to render a user interface and/or receive user input. In an example, the display 840 can be embedded in the vehicle control apparatus 800. In an example, the display 840 is an external peripheral device that may be attached to and detached from the detecting apparatus 1000. The display 840 may be a single-screen or a multi-screen display.

In an example, the processor 830 of the vehicle control apparatus 800 projects the driving path and/or the changed driving path to a front glass or a separate screen of the vehicle using a head-up display (HUD) 840. The vehicle control apparatus 800 may project the driving path and/or the changed driving path to a wind shield glass or a separate screen. However, the displaying of the driving path and/or the changed driving path is not limited to the example described above, and any other instrument cluster, vehicular infotainment system, screen in the vehicle, or display panel in the vehicle may perform the display function. Other displays, such as, for example, smart phone and eye glass display (EGD) that are operatively connected to the vehicle control apparatus 800 may be used without departing from the spirit and scope of the illustrative examples described. In an example, the processor 830 of the vehicle control apparatus 800 outputs the driving path and/or the changed driving path as audio signal through a speaker included in the vehicle.

The vehicle control apparatus 800 is, for example, an autonomous vehicle, an intelligent vehicle including an ADAS, a mobile device, or a separate device that is added to or included in an autonomous vehicle, an intelligent vehicle including an ADAS or a mobile device.

The vehicle control apparatus, vehicle control apparatus 800, devices, and other apparatuses, units, modules, devices, components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1, 3 and 5 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of preventing the collision. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, Blu-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of controlling a vehicle, the method comprising:
   detecting a lane in which a target vehicle is driving and an object in a vicinity of the lane from an image of surroundings of the target vehicle;
   tracking a movement of the object;
   comparing the tracked movement of the object to a danger pattern; and
   controlling the target vehicle based on a result of comparing the tracked movement of the object to the danger pattern,
   wherein the danger pattern is associated with at least one of driving pattern in which a vehicle is driving from side to side in a zigzag path based on a center of line, driving pattern in which a center of a vehicle moves from a left side to a right side of a lane and driving pattern in which a center of a vehicle moves from a right side to a left side of a lane.

2. The method of claim 1, further comprising:
   evaluating a degree of danger caused by the object.

3. The method of claim 2, wherein the evaluating of the degree of danger comprises evaluating the degree of danger based on any one or any combination of a type of the object, an area occupied by the object in a second lane of the object, relative locations of the target vehicle and the object, whether an item is loaded in the object, and a load state of the item.

4. The method of claim 2, wherein the evaluating of the degree of danger caused by the object comprises:
   determining any one or any combination of whether the object exists, a type of the object, a relative location of the object to the target vehicle, whether an item is loaded in the object, and a load state of the item.

5. The method of claim 1, further comprising:
   determining driving information of the target vehicle based on a result of the comparing the degree of danger to the reference value.

6. The method of claim 5, wherein the determining of the driving information further comprises determining the driving information of the target vehicle based on the gap and the degree of danger.

7. The method of claim 6, wherein the determining of the driving information further comprises determining the driving information based on a result of a comparison between the gap and a length of the object, in response to the degree of danger exceeding the reference value.

8. The method of claim 7, wherein the determining of the driving information based on the result of the comparison further comprises determining driving information to adjust a speed of the target vehicle, in response to the gap being greater than or equal to the length of the object.

9. The method of claim 7, wherein the determining of the driving information based on the result of the comparison further comprises, determining driving information to reset a path of the target vehicle, in response to the gap being less than the length of the object.

10. The method of claim 9, wherein the determining of the driving information to reset the path of the target vehicle further comprises:
    determining driving information to reset the path of the target vehicle from a center of the lane to a right space, in response to the object being on a left side of the target vehicle; and
    determining driving information to reset the path of the target vehicle from the center of the lane to a left space, in response to the object being on a right side of the target vehicle.

11. The method of claim 5, wherein the driving information comprises any one or any combination of a speed of the target vehicle and a driving path of the target vehicle based on a result of the comparing of the degree of danger to the reference value.

12. The method of claim 11, wherein the determining of the driving information further comprises determining the driving information based on any one or any combination of a degree of acceleration and/or deceleration of the target vehicle, and a change of the driving path, based on the comparing of the degree of danger to the reference value.

13. The method of claim 5, wherein the driving information comprises any one or any combination of a first location of the target vehicle, a second location of the lane in which the target vehicle is driving, a speed of the target vehicle, and a driving path of the target vehicle.

14. The apparatus of claim 1, wherein the danger pattern is associated with at least one of a drowsiness of a driver of the object, a drunkenness of the driver of the object and an inexperience level of the driver of the object and repeatedly stepping on a brake by the driver of the object.

15. The method of claim 1, wherein the surroundings comprise any one or any combination of the object, a location of the object, a distance to the object from the target vehicle, a traffic situation around the target vehicle, a type of the lane, a road marking, a road line, and a weather.

16. The method of claim 1, wherein the object comprises any one or any combination of a nearby vehicle, a motorcycle, a bicycle, a pedestrian, a building and an animal.

17. The method of claim 1, further comprising:
    detecting a gap between a first object in front of the target vehicle and a second object behind the target vehicle.

18. An apparatus for controlling a vehicle, the apparatus comprising:
    an image sensor configured to capture surroundings of a target vehicle; and
    a processor configured to detect a lane in which the target vehicle is driving and an object in a vicinity of the lane from an image captured by the image sensor, to track a movement of the object, to compare the tracked movement of the object to a danger pattern, to control the target vehicle based on a result of comparing the tracked movement of the object to the danger pattern,
    wherein the danger pattern is associated with at least one of driving pattern in which a vehicle is driving from side to side in a zigzag path based on a center of line, driving pattern in which a center of a vehicle moves from a left side to a right side of a lane and driving pattern in which a center of a vehicle moves from a right side to a left side of a lane.

19. The apparatus of claim 18, wherein the danger pattern is associated with at least one of a drowsiness of a driver of the object, a drunkenness of the driver of the object, an inexperience level of the driver of the object and repeatedly stepping on a brake by the driver of the object.

20. A non-transitory computer-readable storage medium storing instructions that, when executed by a processor, cause the processor to perform:

detecting a lane in which a target vehicle is driving and an object in a vicinity of the lane from an image of surroundings of the target vehicle;

tracking a movement of the object;

comparing the tracked movement of the object to a danger pattern; and controlling the target vehicle based on a result of comparing the tracked movement of the object to the danger pattern, wherein the danger pattern is associated with at least one of driving pattern in which a vehicle is driving from side to side in a zigzag path based on a center of line, driving pattern in which a center of a vehicle moves from a left side to a right side of a lane and driving pattern in which a center of a vehicle moves from a right side to a left side of a lane.

* * * * *